ns", Scherb et al., *Rev. Sci. Inst.*, vol. 47, No. 12, Dec. 1976, pp. 1511–1515.
"Pulsed Beam Chopper for Lamp", Bentley et al., *IEEE Trans. on Nuclear Sci.*, vol. NS-22, No. 3, 1975, pp. 1526–1528.
"In-Line Faraday Cup for Ion Implantation", Keller, *IBM Tech. Discl. Bull.*, vol. 17, No. 8, Jan. 1975, p. 2457.

*Primary Examiner*—Bruce C. Anderson
*Attorney, Agent, or Firm*—James E. Nilles

[57] ABSTRACT

The invention relates to an ion current measuring device.

This device comprises a vacuum chamber, a diaphragm for introducing an ion beam into the chamber, means for collecting the ions from the diaphragm and located at the end of the chamber opposite to the diaphragm, and means for measuring a periodic voltage between the collecting means and the reference earth. It is characterized in that it also comprises means located between the diaphragm and the collecting means, for bringing about a periodic modulation of the intensity of the ion current circulating between the collecting means and a reference earth, the measuring means being current or frequency measuring means.

Application to the measurement of ion currents, particularly in mass spectrometry.

7 Claims, 4 Drawing Figures

United States Patent [19]
Boyer et al.

[11] Patent Number: 4,517,462
[45] Date of Patent: May 14, 1985

[54] DEVICE FOR MEASURING AN ION CURRENT PRODUCED BY AN ION BEAM

[75] Inventors: Robert Boyer, Pierrelatte; Claude Duval, Saint Paul Trois Chateaux, both of France

[73] Assignee: Commissariat a l'Energie Atomique, Paris, France

[21] Appl. No.: 434,835

[22] Filed: Oct. 18, 1982

[30] Foreign Application Priority Data

Oct. 21, 1981 [FR] France .................. 81 19760

[51] Int. Cl.³ .............................. B01D 59/44
[52] U.S. Cl. .................... 250/286; 250/290; 250/397
[58] Field of Search ............. 250/286, 287, 290, 396, 250/397

[56] References Cited

U.S. PATENT DOCUMENTS

| | | | |
|---|---|---|---|
| 2,612,607 | 9/1952 | Stephens | 250/286 |
| 2,659,822 | 11/1953 | Lee | 250/286 |
| 3,258,591 | 6/1966 | Blauth et al. | 250/290 |
| 3,551,675 | 12/1970 | Miller et al. | 250/391 |

OTHER PUBLICATIONS

"Measurement of Equilibrium Charge Distribution with a Thick Target", Fukuzawa, *Physics Lett.*, vol. 43A, No. 2, 2–73, pp. 147–148.
"Atomic Beam Spectrometer for Surface Investiga-

DEVICE FOR MEASURING AN ION CURRENT PRODUCED BY AN ION BEAM

BACKGROUND OF THE INVENTION

The present invention relates to a device for measuring an ion current produced by an ion beam. It more particularly applies to the measurement of ion currents produced by ion beams from a mass spectrometer source.

Various devices for measuring ion currents, particularly in mass spectrometry are already known. The main difficulty which occurs in these measurements is due to the fact that the ion currents are very small and that, despite the use of amplifier chains and costly "amperemeters", it is difficult to directly measure currents, which are often below $10^{-16}$ amperes. The amplifier chains are generally direct current amplifier chains and it frequently occurs that the leakage currents or background noise have an amplitude higher than that of the current to be measured.

It is known that this disadvantage can in part be obviated by using measuring devices comprising alternating current amplifier chains. Two methods are known for using alternating current amplifier chains. It is possible to modulate the ion beam at the time of its formation. In a mass spectrometer, this modulation occurs at the output of the ionization chamber, prior to the space which is subject to a magnetic field for separating the ions from the sources. For example, this modulation can be carried out by a rotating or vibrating device, traversed by the ions from the chamber. The main disadvantage of this modulation at the source is that it affects the ion beam prior to the magnetic separation. It is also possible to modulate the current from ion collectors. This modulation has the main disadvantage of being performed on very low currents ($10^{-15}$ to $10^{-16}$ A). As the chain amplifiers work in closed loop using negative feedbacks in which are involved very high value resistors ($10^{10}$ to $10^{12}$ ohms), the inherent noise of the resistors added to the input noise of the amplifiers, their leakage current and their drift, lead to a signal-to-noise ratio, which limits the detection to 100 $\mu$V at the terminals of a $10^{11}$ ohm resistor.

BRIEF SUMMARY OF THE INVENTION

The problem of the present invention is to obviate these disadvantages and in particular to provide a device for measuring an ion current produced by an ion beam, in which the intensity of the ion current is modulated by means located within the vacuum chamber after separation and level with the ion collectors. As will be shown hereinafter, this makes it possible to obviate any background noise problem, linked with a modulation performed at the input of the amplifier chain of the measuring current.

The present invention therefore relates to a device for measuring an ion current produced by an ion beam, comprising a vacuum chamber connected to a reference earth, a diaphragm for introducing the ion beam into said chamber and which is located at one end of the box, means for collecting the ions from the diaphragm and which are positioned at the opposite end of the chamber, and means for measuring a periodic voltage between the collection means and the reference earth, wherein it also comprises means located between the diaphragm and the collection means, in order to bring about a periodic modulation of the intensity of the ion current circulating between the collection means and the reference earth, the measuring means being current or frequency measuring means.

According to another feature of the invention, the modulation means comprise deflecting plates located in the chamber and insulated therefrom, said plates being parallel to the direction of the beam of ions from the diaphragm and are connected to means for alternately and periodically applying to them opposite potentials, in such a way as to bring about a periodic alternating scanning of the ion beams. On the collection means, the latter comprising two juxtaposed collecting electrodes, which are insulated from one another and from the chamber, which are alternately and periodically scanned by the beam.

According to another feature, the measuring means are constituted by an amplifier chain for measuring a periodic voltage or current, said chain having two inputs respectively connected to each collecting electrode.

According to another feature, the device also comprises a voltage-frequency converter, whereof one input is connected to an output of the amplifier chain, and whereof one output is connected to a control input of the means making it possible to alternately and periodically apply to the deflecting plates opposite potentials, in such a way that the scanning frequency of the collecting electrodes is made dependent on the intensity of the ion current.

According to another feature, the modulating means comprise means located upstream of the collecting means for periodically storing the ions in the chamber and for periodically releasing them to the collection means, as well as means for synchronizing the means for periodically storing and releasing the ions.

According to another feature, the means for periodically storing and releasing the ions comprise an assembly of electron lenses, whose axis corresponds to the direction of the beam from the diaphragm, said electron lenses being connected to means for applying thereto periodic and repetitive supply voltages having respectively for said lenses, first values during a first storage period of the ions in the chamber, and second values during a second release period of the said ions, said supply means being controlled by synchronization means.

According to another feature, the electron lenses are arranged in such a way that the application of voltages having the first values produces in the space defined by the assembly of lenses a potential trough in which the ions oscillate during the first period, whereas the application of voltages having the second values produces in the said space a potential drop directed towards the collecting means, said potential drop releasing the ions towards the collection means during the second period.

According to another feature, the measuring means are constituted by an amplifier chain for measuring a periodic current or voltage, one input of said chain being connected to an output of the collecting means.

According to another feature, the collecting means are constituted by a single electrode, which is insulated from the box.

Finally, according to another feature, the device also comprises a voltage-frequency converter, whereof one input is connected to an output of the amplifier chain and whereof one output is connected to a control input of the synchronization means, so that the latter control the means for applying to the lenses voltages of the first values and second values during the first and second repetitive periods.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
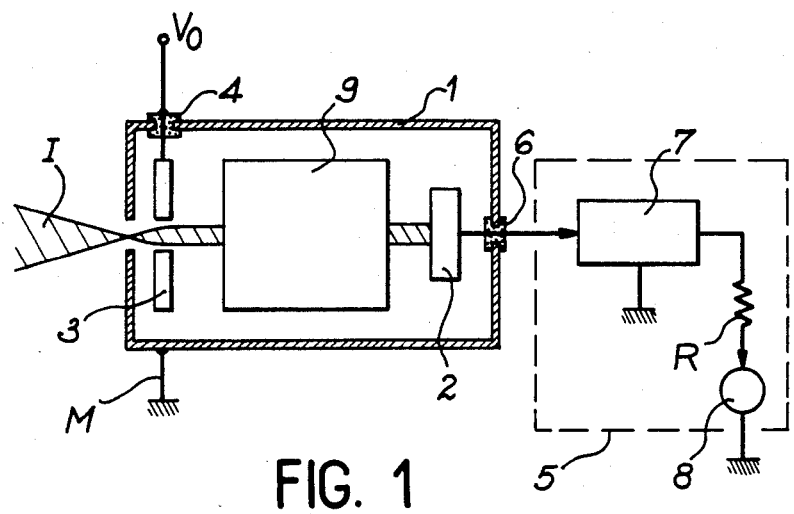
FIG. 1 very diagrammatically, the device according to the invention.

FIG. 1 very diagrammatically shows a measuring device according to the invention, which makes it possible to measure the ion current produced by an ion beam I, coming e.g. from the exit slit of a not shown mass spectrometer, on the basis of a voltage or current measurement. The device comprises a vacuum chamber 1 connected to a reference earth M, as well as a diaphragm 3 for introducing the ion beam into the said chamber, said diaphragm 3 being raised e.g. to a potential $V_O$ and passes through the chamber through an insulating passage 4. It is obvious that it can be formed by one or more electron lenses and that it makes it possible to transform the ion beam arriving at one end of the chamber into an ion beam parallel to the axis of said chamber. The device also comprises ion collecting means 2, located at the opposite end of the chamber, as well as measuring means 5 connected, through an insulating passage 6, to the collecting means 2. These measuring means comprise, for example, an amplifier chain 7, followed by a measuring apparatus 6, such as an amperemeter measuring the current in a resistor R, the latter being proportional to the ion current. It is obvious that the measurement can also be that of a voltage, at the output of the amplifier chain. The system also comprises means 9, which will be described in greater detail hereinafter, between diaphragm 3 and collecting means 2 and which make it possible to obtain a periodic modulation of the intensity of the ion count circulating between collecting means 2 and the reference earth.

Figure 2:
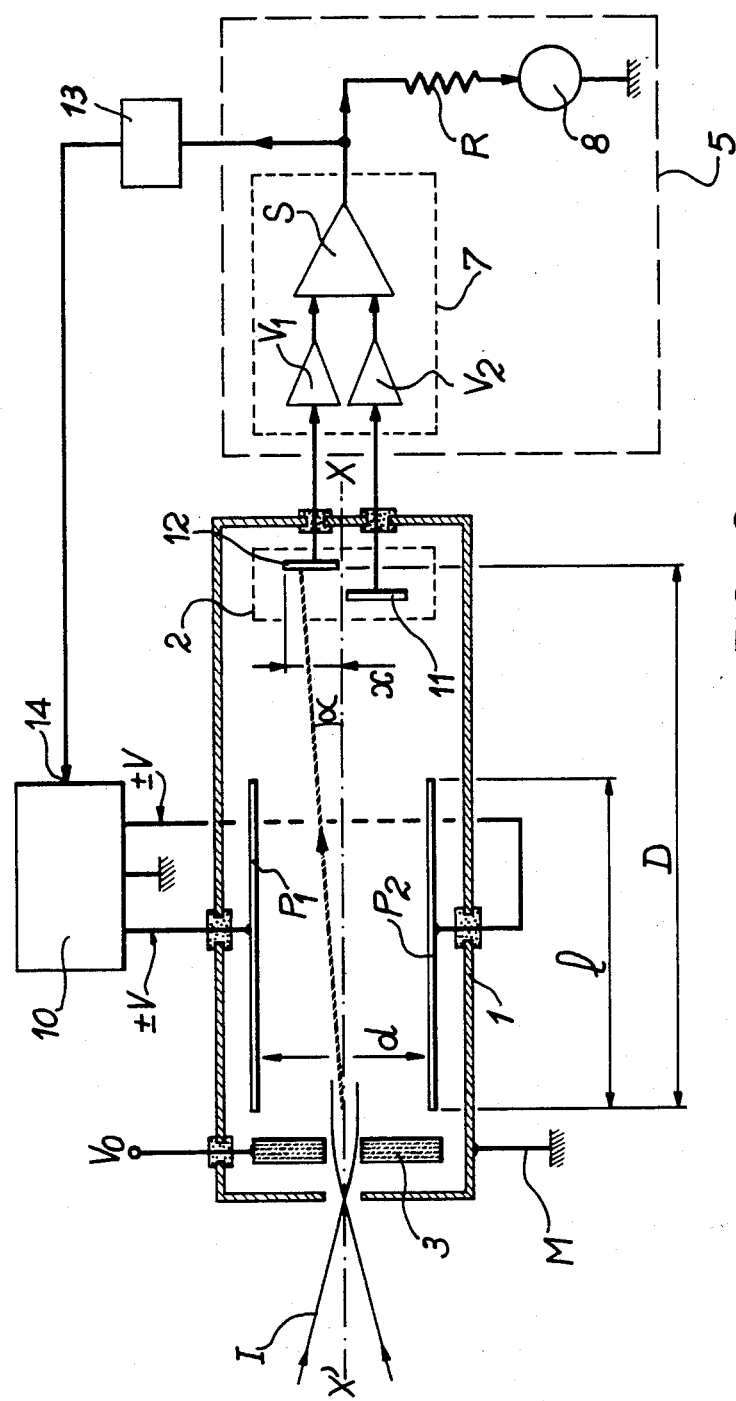
FIG. 2 diagrammatically a measuring device according to the invention for a first embodiment.

FIG. 2 shows in a more detailed manner a first embodiment of the device according to the invention. The same elements carry the same references as in FIG. 1. In this first embodiment of the device according to the invention, the modulation means 9 comprise two deflecting plates P1, P2, located in the chamber and insulated therefrom. These plates are parallel to the direction of the ion beam from diaphragm 3 and are connected to means 10, which make it possible to apply thereto opposite potentials in an alternating and periodic manner. This leads to an alternating, periodic scanning of the collecting means 2 by the ion beam. In this first embodiment, the collecting means comprise two juxtaposed collecting electrodes 11, 12, which are insulated from one another and from the chamber. These electrodes are alternately and periodically scanned by the beam from plates P1, P2, as a result of the alternating periodic variation of the electric field between these plates. The amplifier and measuring chain connected to collecting means 2 is in this case formed by two amplifying channels A1, A2, connected e.g. to an adder S. Each of these channels amplifies the signal received on the corresponding input and coming from one of the collecting electrodes 11, 12. Thus, at the output of each of these channels A1, A2, periodic pulses are obtained, whose frequency is dependent on the frequency at which the voltages, which are alternatively applied to plates P1, P2, are commutated and whose amplitude is dependent on the intensity of the ion beam. The output of adder S is connected e.g. to an alternating amperemeter 8, via a resistor R.

In this embodiment, the device also comprises a voltage-frequency converter 13, whereof one input is connected to an output of the amplifier chain 7 and whereof one output is connected to a control input 14 of means 10 making it possible to periodically and alternately apply opposite potentials to deflecting plates P1, P2. The voltage-frequency converter makes it possible to make the scanning frequency of the ion collecting electrodes 11, 12 dependent on the intensity of the ion current. The means 10 can comprise e.g. voltage generators of known type and whose outputs change the polarity with respect to the reference earth, as a function of a switching signal applied to its control input 14.

The device described hereinbefore makes it possible to measure by means of alternating measuring and amplifying chains, the intensity of ion currents produced by ion beam, without it being necessary to modulate this beam at the ouput of the ion source or at the output of collecting means. It also makes it possible to obviate all problems connected with the positioning of the measuring device relative to the source and all problems, which, with known devices are due to the background noise resulting from the modulation of signals from the ion collecting means. This device has a very simple construction. It is very easy to calculate the deflection x of the beam on each of the electrodes and the absolute value V of the potential applied to each of the deflecting plates P1, P2. This potential can alternatively and periodically assume the values $+V$ and $-V$ on each of the deflecting plates. Thus, by designating as $\alpha$ the deflection angle of the ion beam between the deflecting plates, with respect to the axis of the device, E the electric field between the deflecting plates, $V_O$ the accelerating current of the beam by diaphragm 3, d the distance between the deflecting plates, V the absolute value of the voltage applied to each of these plates, $v_O$ the velocity of the ions and m their earth, D the distance between the end of the deflecting plates on the side of the diaphragm and the collecting electrodes, l the length of the deflecting plates, it is possible to write $$tg\alpha = (e/m) \cdot E \cdot (l/v_{O2})$$

It is also known that $\frac{1}{2}mv_O{}^2 = eV_O$ and $E = v/d$, so that $tg\alpha = (1/2d) \cdot (V/V_O)$,
hence it is possible to deduce:

$$x = (lD/2d) \cdot V/V_O$$

$$V = x \cdot (2d/lD) \cdot V_O$$

Figure 3:
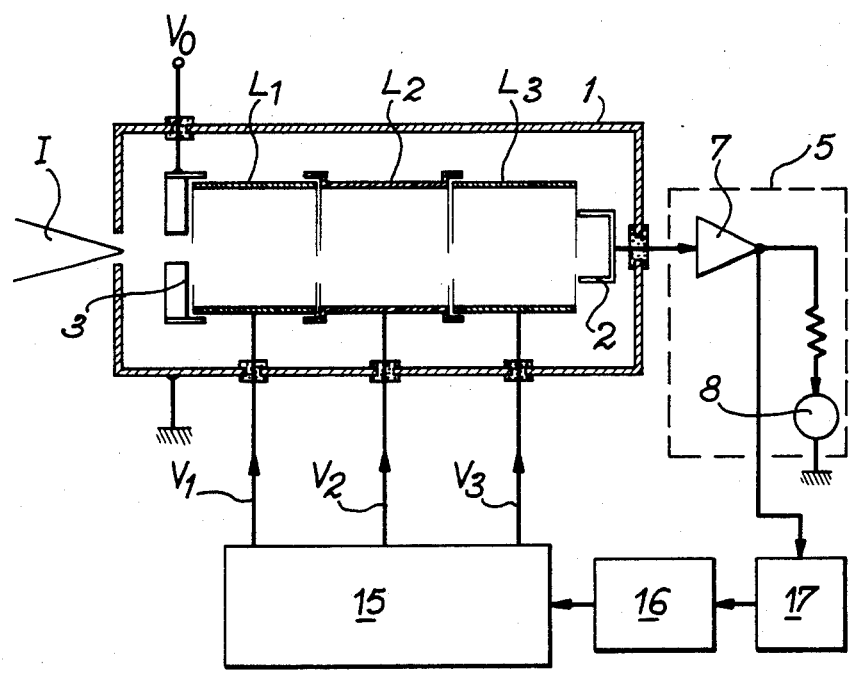
FIG. 3 diagrammatically a device according to the invention for a second embodiment.

FIG. 3 diagrammatically shows a second embodiment of the device according to the invention. In this embodiment, the modulating means comprise electron lenses L1, L2, L3 located upstream of the collecting means 2 on the path of ion beam I. The axis of these lenses corresponds to the direction of the beam from diaphragm 3. As will be shown hereinafter, these lenses make it possible to periodically store the ions in the chamber and then to periodically release them towards the collecting means 2 in a repetitive manner. To this end the lenses are connected to means 15 making it possible to apply thereto periodic, repetitive supply voltages V1, V2, V3. These voltages respectively have first values during a first storage period of the ions in the chamber and second values during a second period for releasing these ions towards the collecting means 2. The supply means of lenses L1, L2, L3 are controlled by synchronization means 16, themselves connected to a voltage-frequency converter 17, whose input is connected to the output of the alternating amplifier chain 7. The measuring means are shown at 8 in FIG. 3 and can be constituted, as hereinbefore, by an alternating amperemeter, connected to earth by a resistor R. As will be shown hereinafter, at the output of amplifier chain 7 are obtained pulses, whose amplitude is proportional to the quantity of ions released from the box during the second period, for which the second voltage voltage values are applied to the electron lenses.

Figure 4:
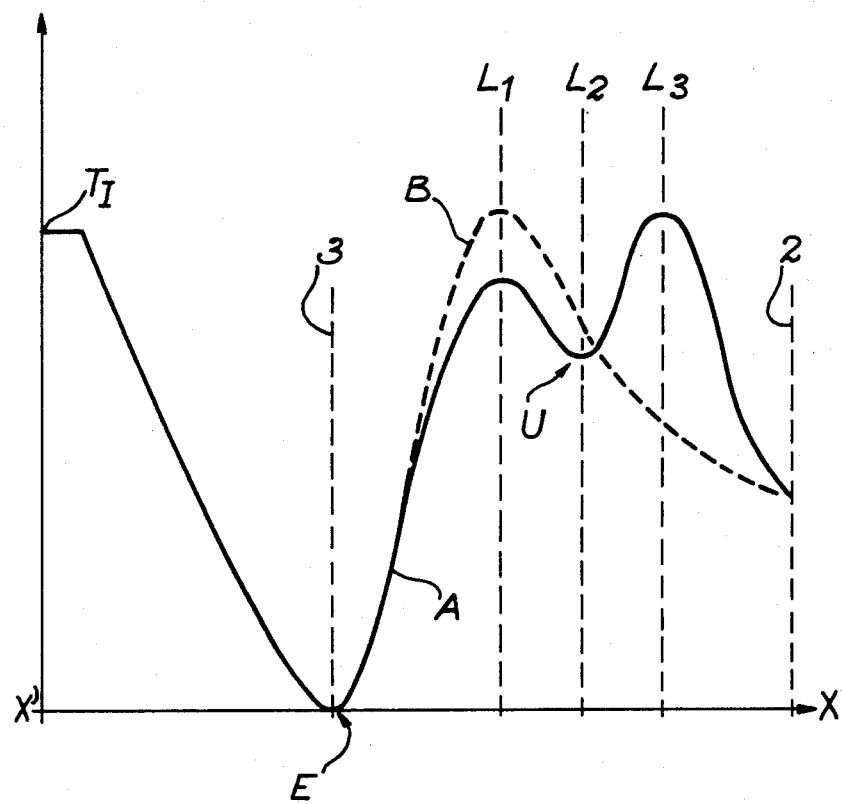
FIG. 4 a graph showing the potential distribution along the axis of the measuring device of FIG. 3.

FIG. 4 is a graph showing the potential distribution along the axis of the measuring device of FIG. 3. In the graph, reference A represents the potential distribution along axis X—X' of the device during the first storage period of the ions in potential trough U, produced between lenses L1 and L3. References 2 and 3 respectively designate the locations of the collecting electrodes 2 and the diaphragm 3. It is assumed that the lenses forming this diaphragm are raised to potentisla such that at at the output thereof, the potential V is zero, as is represented by point E of the graph. It is also assumed that at the output of the source, the ions are subject to potential $V_j$. Lenses L1 and L3 are assumed to be raised to adjacent potentials, such that lens L3 has a potential slightly higher than that of lens L1. In an embodiment, the potential of lens L3 is slightly higher than 4 kV, whereas the potential of lens L1 is slightly lower than 4 kV. Lens L2 is raised to a potential well below that of lenses L1 and L3 (approx. 3 kV), so as to produce a potential trough U between these lenses. As a result of this distribution, the ions coming from a source are slowed down between the source and diaphragm 3, accelerated between the latter and lens L1 and then reach a potential trough U (between L1 and L3) in which they oscillate throughout the first application period of the aforementioned potentials to lenses L1, L2 and L3 and which make it possible to produce trough U. When sufficient ions have been stored in the potential trough, during the second period (graph B), the values of the potentials applied to lenses L1, L2 and L3 are modified. During this second period, the potentials applied to lenses L1, L2 and L3 are such that the potential applied to lens L1 (e.g. approximately 4 kV) is higher than the potential applied to lens L2, itself higher than the potential applied to lens L3. Thus, the ions which were stored in the potential trough U, between lenses L1 and L3, are discharged, as a result of the decreasing potentials in the direction of electrode 2 (e.g. raised to a potential of approximately 2 kV).

In the embodiment described hereinbefore, it is assumed that the distance between lenses L1 and L3 is close to 2 cm, whereas the distance between lens L2 and electrode 2 is close to 4 cm. The periods of storing the ions and of transferring them to the collecting electrode are respectively close to 0.58 s and 1.17 s. The repetition frequency of the storage and transfer periods is close to 500 kHz.

It is obvious that the device can optionally comprise at the output of the amplifier chain, a threshold detector for performing measurements on pulses having an adequate amplitude.

It is obvious that in the device described hereinbefore, the means used could have been replaced by equivalent means without passing beyond the scope of the invention.

What is claimed is:

1. A device for measuring an ion current produced by an ion beam, comprising a vacuum chamber connected to a reference earth, a diaphragm for introducing the ion beam into said chamber and which is located at one end of the chamber, means for collecting the ions from the diaphragm and which are positioned at the opposite end of the chamber, means located between the diaphragm and the collection means, in order to bring about a periodic modulation of the intensity of the ion current circulating between the collection means and the reference earth, and means for measuring a periodic voltage between the collection means and the references earth, said modulation means comprising deflecting plates located in the chamber and insulated therefrom, said plates being parallel to the direction of the beam of ions from the diaphragm and connected to means for alternately and periodically applying to them opposite potentials, in such a way as to bring about a periodic alternating scanning of the ion beams on the collection means, the latter comprising two juxtaposed collecting electrodes, which are insulated from one another and from the chamber, and which are alternately and periodically scanned by the beam, said measuring means being current or frequency measuring means and comprising an amplifier chain for measuring a periodic voltage or current, said chain having two inputs respectively connected to each collecting electrode, said device further comprising a voltage-frequency converter, wherein one input is connected to an output of the amplifier chain, and wherein one output is connected to a control input of the means making it possible to alternately and periodically apply to the deflecting plates opposite potentials, in such a way that the scanning frequency of the collecting electrodes is made dependent on the intensity of the ion current.

2. A device according to claim 1, wherein the modulating means comprise means located upstream of the collecting means for periodically storing the ions in the chamber and for periodically releasing them to the collection means, as well as means for synchronizing the means for periodically storing and releasing the ions.

3. A device according to claim 2, wherein the means for periodically storing and releasing the ions comprise an assembly of electron lenses, whose axis corresponds to the direction of the beam from the diaphragm, said electron lenses being connected to means for applying thereto periodic and repetitive supply voltages having respectively for said lenses, first values during a first storage period of the ions in the chamber, and second values during a second release period of the said ions, said supply means being controlled by synchronization means.

4. A device according to claim 3, wherein the electron lenses are arranged in such a way that the application of voltages having the first values produces in the space defined by the assembly of lenses a potential trough in which the ions oscillate during the first period, whereas the application of voltages having the second values produces in the said space a potential drop directed towards the collecting means, said potential drop releasing the ions towards the collection means during the second period.

5. A device according to claim 4, wherein the measuring means are constituted by an amplifier chain for measuring a periodic current or voltage, one input of said chain being connected to an output of the collecting means.

6. A device according to claim 5, wherein the collecting means are constituted by a single electrode, which is insulated from the box.

7. A device according to claim 5, wherein it also comprises a voltage-frequency converter, whereof one input is connected to an output of the amplifier chain and whereof one output is connected to a control input of the synchronization means, so that the latter control the means for applying to the lenses voltages of the first values and second values during the first and second repetitive periods.

* * * * *